United States Patent [19]

Glonek et al.

[11] E Patent Number: Re. 32,181

[45] Reissued Date of Patent: Jun. 17, 1986

[54] STRUCTURAL FOAM SWIMMING POOL WALL AND BRACE AND METHOD OF ERECTING SAME

[75] Inventors: Robert L. Glonek, 3256 Rickman, NE., Grand Rapids, Mich. 49505; Paul Kantor; Loren R. Perry, both of Berrien Springs, Mich.

[73] Assignee: Robert L. Glonek, Grand Rapids, Mich.

[21] Appl. No.: 697,143

[22] Filed: Feb. 1, 1985

Related U.S. Patent Documents

Reissue of:

[64] Patent No.: 4,464,802
Issued: Aug. 14, 1984
Appl. No.: 312,349
Filed: Oct. 16, 1981

[51] Int. Cl.[4] ..... E04H 3/18; E04H 3/16

[52] U.S. Cl. ..... 4/506; 4/488; 4/513; 52/169.1; 52/169.7; 52/169.8; 111/49

[58] Field of Search ..... 4/506, 488, DIG. 9, 4/487, 513; 52/169.7, 169.1, 146, 745, 741, 693, 655, 149, 152, 247, 241; 119/117, 121; 111/49

[56] References Cited

U.S. PATENT DOCUMENTS

| | | | |
|---|---|---|---|
| Re. 29,936 | 3/1979 | Arp | 52/169.7 |
| 824,182 | 6/1906 | Knoff | 52/156 |
| 942,859 | 12/1909 | Kersey | 248/145 |
| 1,268,459 | 6/1918 | Hjermstad | 52/155 |
| 1,574,329 | 2/1926 | White | 52/695 |
| 2,145,991 | 2/1939 | Nichols | 111/49 |
| 2,812,743 | 11/1957 | Dustin | 119/117 |
| 2,873,505 | 2/1959 | Sheldon | 25/155 |
| 2,987,043 | 6/1961 | Spindler | 119/121 |
| 3,015,191 | 1/1962 | Lucchesi | 50/100 |
| 3,016,546 | 1/1962 | Lerner | 52/169.7 |
| 3,020,560 | 2/1962 | Bedick | 52/169.7 |
| 3,100,556 | 8/1963 | De Ridder | 189/34 |
| 3,190,408 | 6/1965 | Petterson | 189/36 |
| 3,192,538 | 7/1965 | Walter | 4/506 |
| 3,242,624 | 4/1966 | Stier | 52/169 |
| 3,264,020 | 8/1966 | De Ridder | 287/189.36 |
| 3,268,636 | 8/1966 | Angell, Jr. | 264/51 |
| 3,292,325 | 12/1966 | Nicolini | 52/277 |
| 3,298,038 | 1/1967 | O'Connell et al. | 4/506 |
| 3,396,500 | 8/1968 | Lankheet | 52/169 |
| 3,416,165 | 12/1968 | Pereira | 4/506 |
| 3,436,446 | 4/1969 | Angell, Jr. | 264/51 |
| 3,440,780 | 4/1969 | Adam et al. | 52/169 |
| 3,443,263 | 5/1969 | Minasy | 4/506 |
| 3,444,659 | 5/1969 | Shanni | 52/149 |
| 3,458,875 | 8/1969 | Michalke et al. | 4/506 |
| 3,511,002 | 5/1970 | Fox | 52/146 |
| 3,546,720 | 12/1970 | Hoch et al. | 4/506 |
| 3,564,791 | 2/1971 | Arp | 52/169 |
| 3,605,363 | 9/1971 | Bard | 52/241 |
| 3,610,564 | 10/1971 | Mattingly | 249/148 |
| 3,648,303 | 4/1972 | Stewart et al. | 4/506 |
| 3,686,694 | 8/1972 | Gerring | 4/506 |

(List continued on next page.)

FOREIGN PATENT DOCUMENTS

| | | |
|---|---|---|
| 1544932 | 11/1967 | France . |
| 1290823 | 9/1972 | United Kingdom . |

*Primary Examiner*—Henry K. Artis
*Attorney, Agent, or Firm*—Price, Heneveld, Huizenga & Cooper

[57] ABSTRACT

The specification discloses a pool wall assembly including first and second pool wall panels and a brace supporting the panels. Structure is included for securing the brace to only the first panel so that the first panel and brace may be aligned together prior to the securement of the second panel. Structure is also included for securing the second panel to at least one of the first panel and the brace. An anchor assembly secures the brace in position. The anchor assembly includes a stake which extends through and slidingly engages the brace and a wedge, telescopically received in the stake, which can be moved with respect to the stake into forcible engagement with the brace to maintain the brace in position. Each panel includes an integral bead extending from the lower portion of its face to define the line to which the pool side wall overlap extends. Also disclosed is a method of erecting a pool wall using the structure disclosed.

42 Claims, 17 Drawing Figures

U.S. PATENT DOCUMENTS

| | | | |
|---|---|---|---|
| 3,720,964 | 4/1973 | Thomson | 4/510 |
| 3,736,599 | 6/1973 | Kessler et al. | 4/506 |
| 3,739,539 | 6/1973 | Posnick | 52/169 |
| 3,745,727 | 7/1973 | Chichester, Sr. | 52/169 |
| 3,750,197 | 8/1973 | Weir et al. | 4/506 |
| 3,789,435 | 2/1974 | Heisner | 4/506 |
| 3,797,049 | 3/1974 | De Santo | 4/506 X |
| 3,798,857 | 3/1974 | Barrera | 52/169 |
| 3,801,993 | 4/1974 | Stalder | 4/506 |
| 3,820,174 | 6/1974 | Rozanski | 4/506 |
| 3,885,364 | 5/1975 | Lankheet | 52/169 |
| 3,906,688 | 9/1975 | Witte | 52/152 |
| 3,938,199 | 2/1976 | Laven | 4/510 |
| 3,959,830 | 6/1976 | van den Broek | 4/506 |
| 3,971,075 | 7/1976 | Heinbaugh et al. | 4/506 |
| 3,975,477 | 8/1976 | Molitor | 264/35 |
| 3,975,782 | 8/1976 | Lankheet | 4/506 |
| 3,975,874 | 8/1976 | Witte et al. | 52/169 R |
| 3,991,530 | 11/1976 | Scourtes | 52/146 |
| 4,008,547 | 2/1977 | Katzman | 52/169.7 |
| 4,015,379 | 4/1977 | Colson, Jr. | 52/169.1 |
| 4,020,509 | 5/1977 | West | 4/506 |
| 4,023,217 | 5/1977 | Kessler | 4/510 |
| 4,027,442 | 6/1977 | Silverman | 52/309.4 |
| 4,044,514 | 8/1977 | Rubin et al. | 52/169.7 |
| 4,047,340 | 9/1977 | Witte et al. | 52/169.7 |
| 4,048,773 | 9/1977 | Laven | 52/169.7 |
| 4,051,562 | 10/1977 | Jakowicki | 4/494 |
| 4,109,324 | 8/1978 | Cornelius | 4/506 |
| 4,115,977 | 9/1978 | Bertsch | 52/742 |
| 4,118,809 | 10/1978 | Bertsch | 4/506 |
| 4,120,126 | 10/1978 | West | 52/169.7 |
| 4,124,907 | 11/1978 | Laven | 4/506 |
| 4,177,614 | 12/1979 | Arp | 52/247 |

STRUCTURAL FOAM SWIMMING POOL WALL AND BRACE AND METHOD OF ERECTING SAME

Matter enclosed in heavy brackets [ ] appears in the original patent but forms no part of this reissue specification; matter printed in italics indicates the additions made by reissue.

BACKGROUND OF THE INVENTION

The present invention relates to swimming pool walls and braces and methods of erecting same.

Below-ground pools comprising a pool liner, supported by a modular wall and brace structure, have gained popularity due to their low initial installation cost and easy maintenance. Such a pool is usually installed by digging a pool shaped excavation including a perimeter ledge; erecting a modular support wall on this ledge; pouring a concrete footing onto the ledge so as to anchor the wall; backfilling behind the support wall; mounting a coping on the upper surface of the wall; and lining the excavation with a pool liner, suspending the liner from the coping. Filling systems, draining systems, and filtering systems are also installed.

Prior support wall assemblies require, as a practical matter, at least two installers to erect and assemble the modular components. Usually, these walls comprise a plurality of pool wall panels arranged in end-to-end relationship and a plurality of braces supporting the panels. The braces are supported on, and anchored to, the perimeter ledge to support the panels. Often one brace is provided at each abutment of adjacent wall panels and is secured to the panel assembly by aligning apertures in both panels with apertures in the brace and inserting fasteners through all three pieces. All of the apertures in all three pieces of prior assemblies must be aligned prior to the installation of the fasteners. Therefore, two installers are required to support and align all three pieces. The panels and bracket may optionally be clamped together after being aligned to facilitate fastener installation.

Preferably, each brace in the modular construction is anchored to the perimeter ledge to maintain the brace and associated panels in proper alignment. There are two problems associated with this operation. First the brace must be carefully aligned before the anchor is driven into the ledge. Second the brace must be carefully and securely maintained in alignment as the anchor is secured in the ledge.

The modular support wall typically defines only the upper portion of the pool side wall. The remainder of the pool side wall, as well as the pool bottom, is a compacted, vermiculite or earthen surface. To insure a smooth junction between the support wall and the vermiculite, the vermiculite extends partially over each wall panel section, preferably a uniform distance, to provide a clean, neat appearance. With prior constructions, a chalk line must be placed on each panel section after same has been installed to provide a guideline for the upper edge of the overlap. However, installing such a chalk line is a time consuming nuisance and as above, requires two men.

SUMMARY OF THE INVENTION

The present invention comprises a pool wall assembly which may be erected by a single installer. This is achieved by providing first and second pool wall panels, a supporting brace, structure for securing the brace to only the first panel, and structure for securing the second panel to at least one of the brace and the first panel. Consequently, the brace may be secured to only the first panel allowing the brace and first panel to be aligned as a unit. After the brace and first panel are aligned in desired orientation, the second panel is secured to at least one of the brace and the first panel. Because the panels may be selectively, and individually secured to the brace, only one installer is required to assemble the pool wall assembly.

In another aspect of the invention, a unique anchor system, comprising a stake and wedge, is provided to secure the brace to an earthen ledge upon which the brace rests. The stake portion of the anchor system extends through, and slidingly engages, the brace. Because the brace and stake only slidingly engage one another, the brace may be plumbed, or aligned, after the stake has been driven therethrough. After the brace is plumbed into its desired orientation, a wedge member which is telescopically received in the stake is driven downwardly with respect to the stake until it forcibly engages the brace to secure the brace in position.

In yet another aspect of the invention, each pool wall panel includes an integral, generally linear bead extending from the lower portion of its front surface. The bead defines the line to which the vermiculite extends so that the vermiculite may be accurately extended over the lower portion of the pool wall assembly. The necessity of chalk-lining each panel is eliminated, thereby eliminating a time consuming, two-man operation.

These and other objects, advantages, and features of the invention will be more fully understood and appreciated by reference to the written specification and appended drawings.

DESCRIPTION OF THE PREFERRED EMBODIMENT

Figure 1:
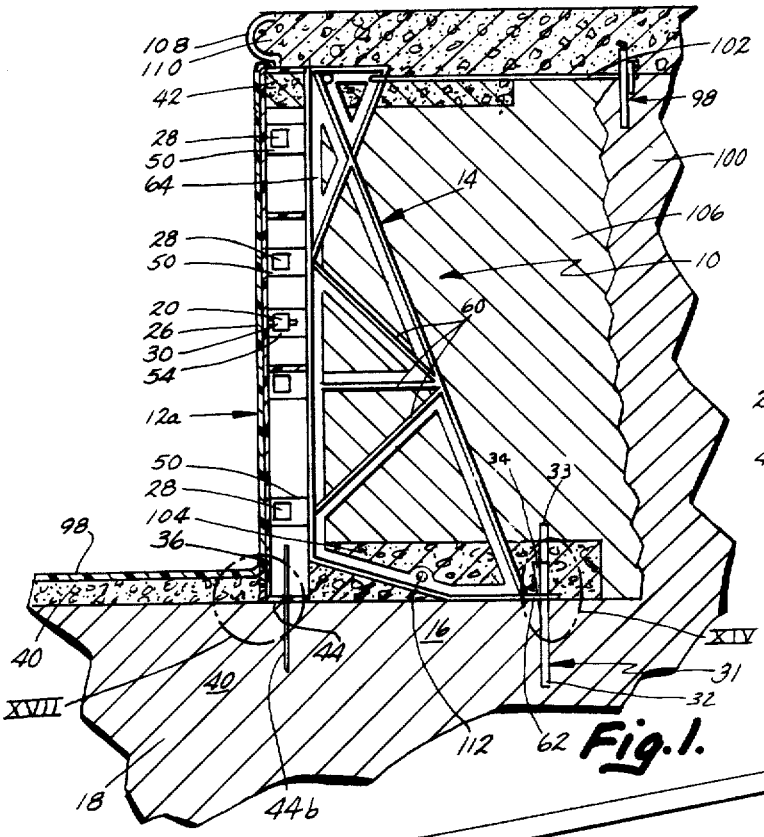
FIG. 1 is a fragmentary, sectional view through the pool wall assembly of the present invention.
Figure 3:
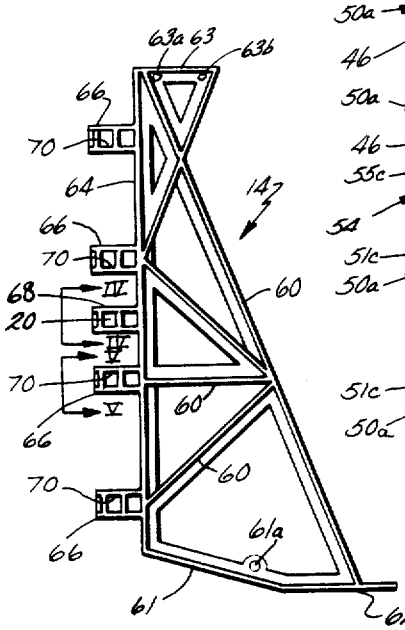
FIG. 3 is a side, elevational view of the brace.
Figure 8:
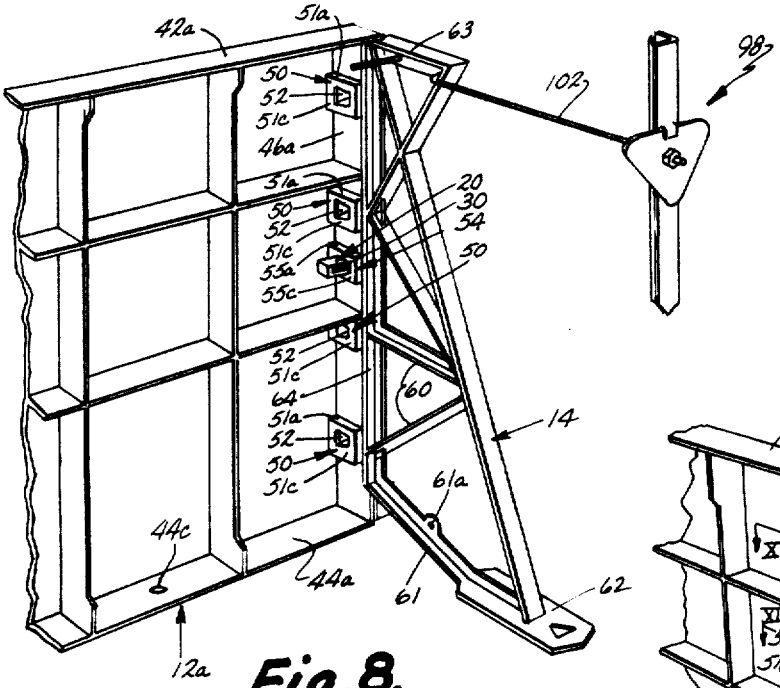
FIG. 8 is a fragmentary, perspective view of a brace secured to a single panel section.
Figure 9:
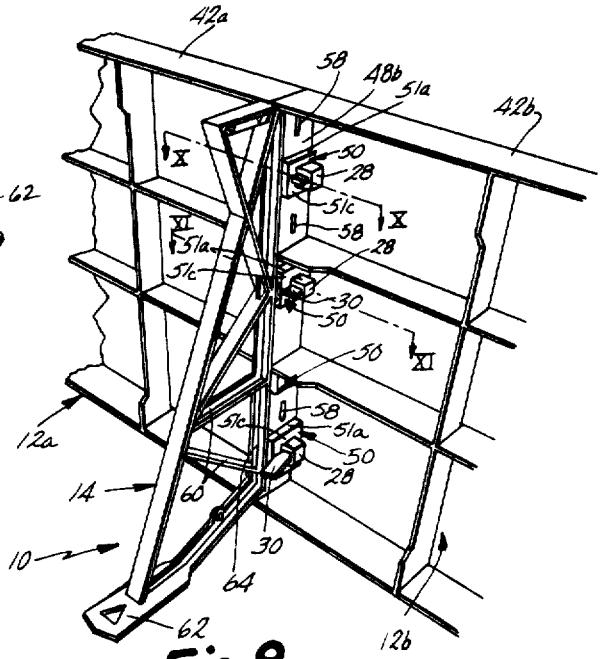
FIG. 9 is a fragmentary, perspective view of a brace secured to two abutting pool wall panels.
Figure 10:
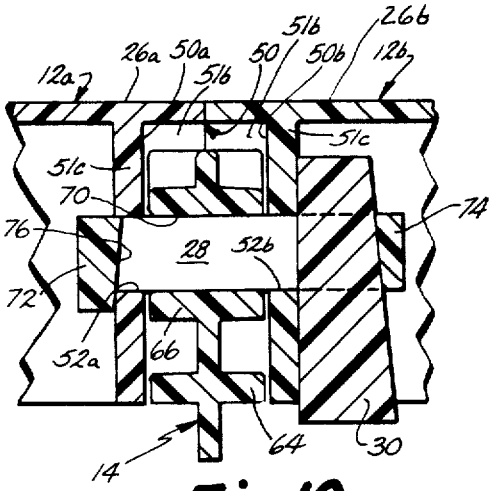
FIG. 10 is a fragmentary, sectional view taken along line X—X in FIG. 9.

In the preferred embodiment, pool wall assembly 10 comprises a plurality of straight panels 12 (e.g. 12a and 12b) abutting one another in end-to-end relationship and supported by a plurality of braces 14 (FIGS. 1 and 9). Abutting side walls 46a and 48b on panels 12a and 12b, respectively, define rearwardly opening pockets 50 into which extend studs 66 from brace 14 (FIGS. 3, 9, and 10). A plurality of slotted pegs 28 extend through studs 66 and side walls 46a and 48b at pockets 50 and are secured therein by forcing a wedge 30 into each slotted peg to secure panels 12a and 12b and brace 14 together. Additionally, stud 68 (FIGS. 3, 4, and 11) which extends into a half-pocket 54 (FIGS. 8 and 11) defined in side wall 46a, includes an integral slotted peg 20 extending through the side wall of half-pocket 54 and is secured therein by forcing another wedge 30 through slot 80 in integral peg 20. When brace 14 is secured only to wall panel 12a using integral slotted peg 20 and wedge 30, this single panel and brace assembly may be aligned as a unit into a desired orientation. Panel 12b may then be moved into abutting relationship with panel 12a so that front surfaces 26a and 26b of the panels define a generally continuous surface and so that side walls 46a and 48b define pockets 50 receiving studs 66 of brace 14 (FIGS. 9 and 10). Slotted pegs 28 are inserted through pockets 50 and studs 66, and a wedge 30 is forced into each slotted peg to tightly draw panels 12a and 12b and brace 14 together. Thus, assembly 10 can easily be erected by one installer working alone.

Figure 15:
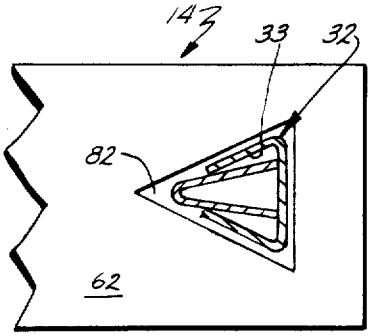
FIG. 15 is a cross sectional view taken along plane XV—XV in FIG. 14.
Figure 16:
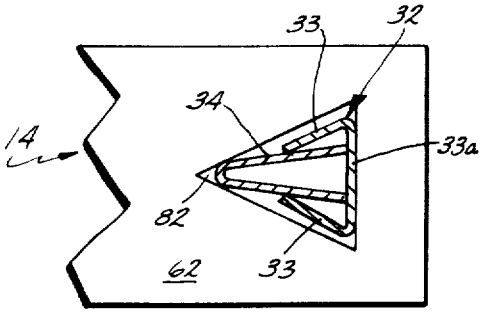
FIG. 16 is a view similar to FIG. 15 with the wedge driven further down into the stake.
Figure 14:
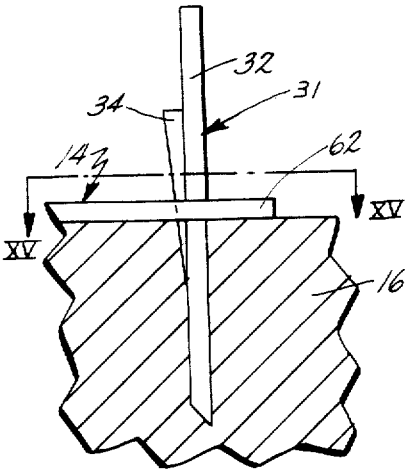
FIG. 14 is an enlarged view of the area within line XIV in FIG. 1.

After assembly 10 has been erected on ledge 16 as described, an anchor 31 is inserted in aperture 82 in foot 62 of each brace 14 and is driven into ledge 16 (FIGS. 1 and 15). Anchor 31 comprises a stake 32 which only slidingly engages brace 14 (FIG. 15) so that the two elements may move relative to one another. Consequently, brace 14 and panels 12a and 12b associated therewith may be plumbed after stake 32 has been secured within ledge 16. Wedge 34 which is slideably but frictionally carried in stake 32 is then driven down stake 32 and into forcible engagement with brace 14 and secure brace 14 in its plumbed orientation (FIGS. 1, 14 and 16).

Figure 17:
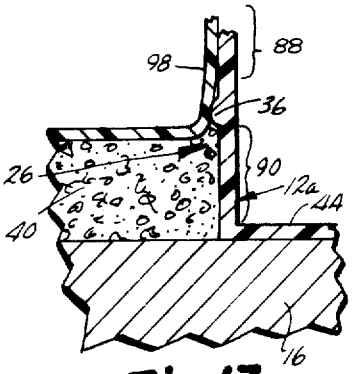
FIG. 17 is an enlarged view of the area within line XVII in FIG. 1.

Molded bead 36 extends outwardly from front surface 26 of each panel 12 approximately an inch and a half from the bottom thereof (FIG. 2) to provide an easily recognizable line to which overlap portion 38 of vermiculite layer 40 should be extended over surface 26 of panel 12 (FIG. 17). Bead 36 eliminates the necessity of marking each panel 12 with a chalk line during pool construction.

Each panel 12 (FIGS. 1, 2, 8, and 9) is preferably injection molded of high impact structural foam plastic such as polystyrene. Other equivalent plastics could be used. Each is generally rectangular, having a front surface 26, top wall 42, bottom wall 44, side walls 46 and 48, and supporting rib structure 49. Side walls 46 and 48 each include deviations projecting inwardly towards the opposite side wall to define four generally identical half-pockets, or recesses, 50a and 50b, each of which is delineated by top wall 51a (FIGS. 8 and 9), bottom wall 51b (FIGS. 2 and 10), and vertical wall 51c (FIGS. 2, 8, 9, and 10) extending between the top and bottom walls. An irregular, specifically trapezoidally shaped aperture 52 (FIGS. 2, 8, and 10) extends through each of side walls 51c in half-pockets 50a and 50b to receive one of slotted pegs 28.

Figure 2:
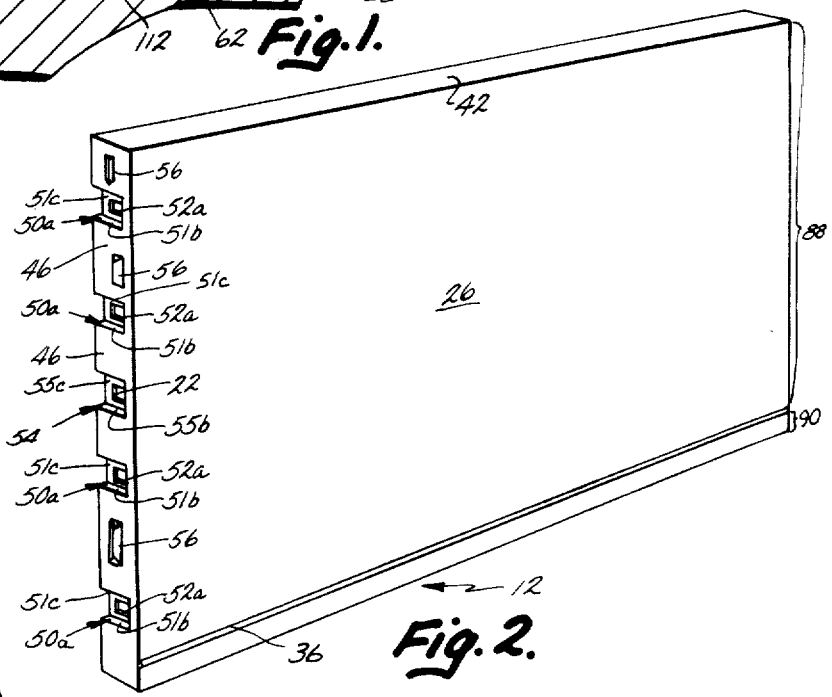
FIG. 2 is a perspective view of a pool wall panel.
Figure 11:
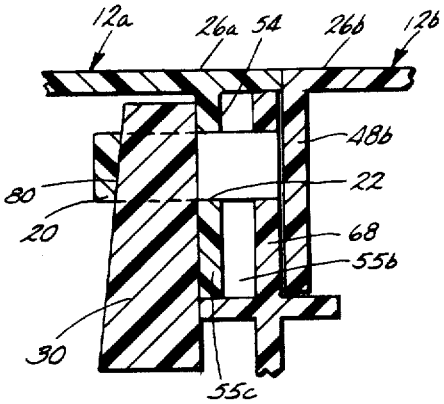
FIG. 11 is a fragmentary, sectional view taken along line XI—XI in FIG. 9.

Side wall 46 includes another inwardly directed deviation defining half-pocket 54, identical to half-pockets 50a, located approximately midway along the height of panel 12 (FIGS. 2 and 11). No mating half-pocket is found in side wall 48. Half-pocket 54 is delineated by top wall 55a (FIG. 8), bottom wall 55b (FIGS. 2 and 11), and side wall 55c (FIGS. 2, 8, and 11) extending therebetween and defining aperture 22 in side wall 55c to receive integral peg 20.

Integral projections 56 (FIG. 2) extend from side wall 46 into receiving apertures 58 (FIG. 9) defined in side wall 48 of an abutting panel to align panels 12a and 12b as same are brought together. Half-pockets 50a of panel 12a generally align, or mate, with half-pockets 50b (FIG. 10) to define pockets 50 opening rearwardly when the two panels are placed in abutting relationship as shown in FIG. 9. Each of half-pockets 50a and 50b defines one-half of pocket 50 to accommodate one-half of stud 66 so that each pocket 50 receives one entire stud. Further, apertures 52a in side wall 46 are also generally aligned, or coaxial, with apertures 52b defined in side wall 48 when the two panels are in end-to-end relationship.

Brace 14 (FIGS. 3, 4, and 5) is also preferably injection molded of polypropylene or other suitable plastic material. Each brace 14 includes vertical upright 64, foot 62, cross-brace structure 60 interconnecting upright 64 and foot 62. Foot 62 (FIGS. 3, 14, 15, and 16) of brace 14 is oriented generally horizontally on ledge 16 when brace 14 is in its desired orientation. Foot 62 defines a generally triangular aperture 82 to receive anchor 32 (FIGS. 15 and 16). Part of cross-brace structure 60 is an upwardly sloping member 61 joining foot 62 to upright 64. It includes an aperture 61a therein for receiving rebar therethrough. At the top of cross-brace structure 60 is a top cross piece 63 having a forward aperture 63a therein, also for receiving rebar, and a rearward aperture 63b for receiving adjusting rod 102 (FIG. 8).

Figure 4:
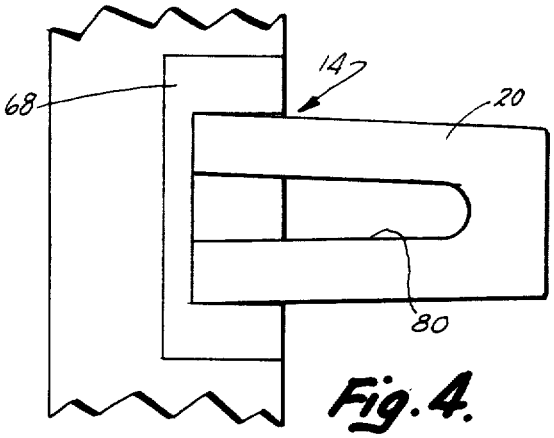
FIG. 4 is a fragmentary view taken along plane IV—IV in FIG. 3.
Figure 5:
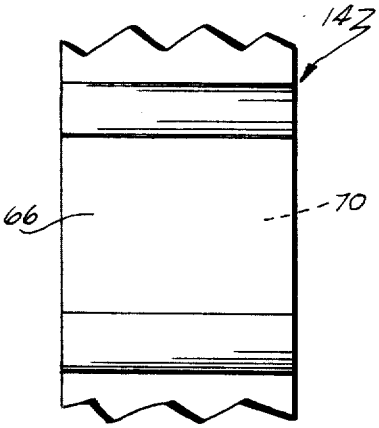
FIG. 5 is a fragmentary view taken along plane V—V in FIG. 3.

Four studs 66 and integral peg stud 68 extend forwardly (i.e. towards panels 12) from upright 64. Integral peg stud 68 has a width approximately one-half the width of one of studs 66 and includes an integral slotted peg 20 extending laterally from the stud (FIGS. 4 and 11). Slot 80 in integral peg 20 opens horizontally rearwardly (i.e. away from panels 12) to facilitate convenient insertion of peg 24 thereinto. Each of studs 66 includes an aperture 70 extending laterally therethrough which is generally aligned, or coaxial, with apertures 52a and b in rearwardly opening pockets 50 in abutting panels 12a and 12b (FIG. 10).

Figure 6:
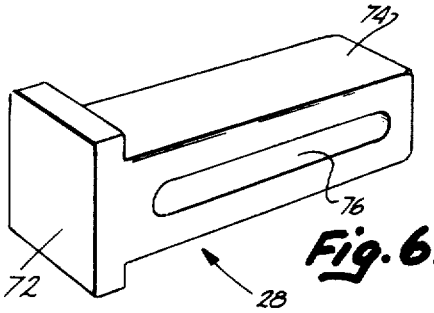
FIG. 6 is a perspective view of a slotted peg.

Slotted pegs 28, preferably injection molded of the same material as brace 14, (FIG. 6) are designed to extend through each set of aligned apertures 52a and b and 70 in panels 12a and 12b and studs 66 of brace 14, respectively, (FIGS. 9 and 10). Each of slotted pegs 28 (FIG. 6) includes a head 72, an elongated body portion 74 extending from head 72, and a slot 76 extending through elongated portion 74 generally laterally from side to side thereof. Each slotted peg 28 is trapezoidal in cross section conforming to the shape of apertures 52. The reason for this trapezoidal fit is to insure that each peg 28 can only be inserted through apertures 52a, b and 70 with its lateral slot 76 opening rearwardly (with respect to panels 12) to facilitate insertion of wedges 30 through slot 76 (FIGS. 9 and 10).

Figure 7:
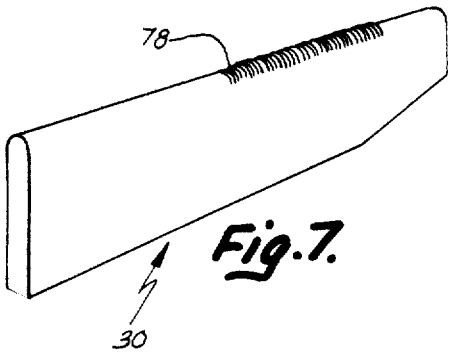
FIG. 7 is a perspective view of a wedge.

Wedge 30, also preferably injection molded of the same material as brace 14, (FIG. 7) is a generally wedge-shaped body including a plurality of teeth 78 along one side thereof to aid in retaining the wedge within slotted peg 28.

Anchor assembly 31 for brace 14 includes a stake 32 and a wedge 34 slideably, but frictionally carried thereby. Stake 32 is formed of a metal wall defining a generally triangular void 86 within spaced side walls 33 joined by a base wall 33a. Stake 32 is slightly smaller than aperture 82 and hence only slidingly engages foot 62 of brace 14 so that the two elements may be moved relative one another after the stake 32 has been driven into ledge 16. The apex of the triangle defined by the cross section of stake 32 is open so that wedge 34 can be slideably carried within void 86 and still project from stake 32 (FIG. 14). Wedge 34 is generally V-shaped in cross section with the "V" being deeper at the top of wedge 34 than at the bottom. The width of the "V" is such that the "V" walls frictionally engage the terminal edges of side walls 33 of stake 32. Preferably, wedge 34 is located within stake 32 about an inch and one-half below the top of stake 32 before stake 32 is driven into ledge 16.

Figure 12:
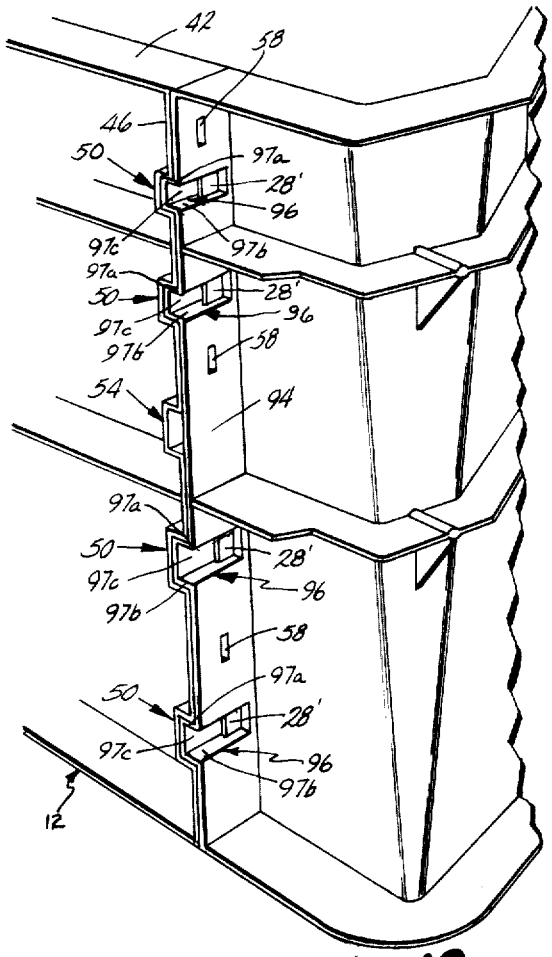
FIG. 12 is a fragmentary, perspective view of a straight pool wall panel connected to a corner pool wall panel.
Figure 13:
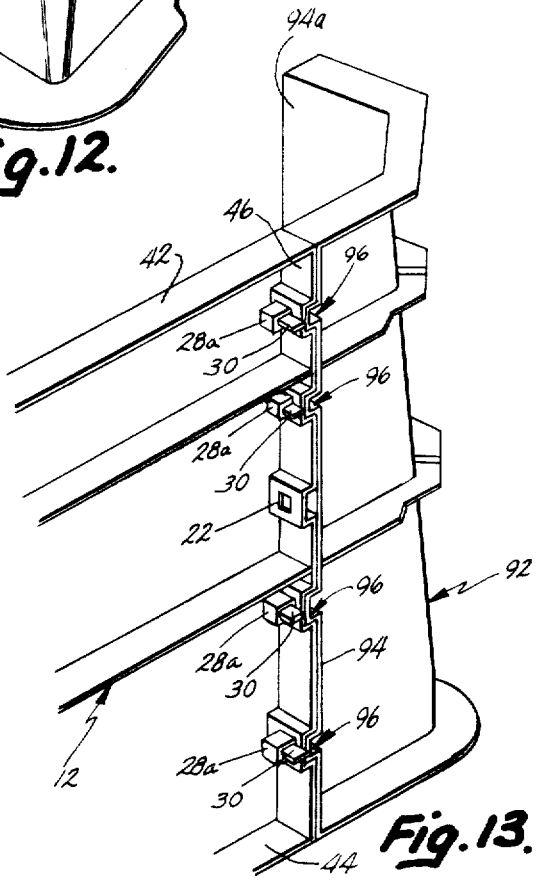
FIG. 13 is another fragmentary, perspective view of a straight pool wall panel connected to a corner pool wall panel.

FIGS. 12 and 13 show a corner panel 92 secured to a straight panel 12. Side wall 94 of corner section 92 includes deviations outwardly to define four projections 96. These extend into half-pockets 50a when panels 12 and 92 are placed in abutting relationship. Each of projections 96 includes top wall 97a, bottom wall 97b, and side wall 97c extending therebetween. Side wall 97c includes a trapezoidally shaped aperture (not visible) which is aligned with the corresponding aperture 52 defined by half-pocket 50a in panel 12. Short slotted pegs 28a extend through side walls 46 and 94 and are secured in position using wedges 30. Short pegs 28a are similar to peg 28 shown in FIG. 6, except they are shorter. Brace 14 is not included at the junction of straight panel 12 with corner panel 92.

Assembly

Pool wall assembly 10 greatly facilitates the installation of a below-ground swimming pool. Pool installation is begun by digging excavation 18, forming circumferential ledge 16 around the entire periphery of the excavation (FIG. 1). Brace 14 is secured to side wall 46 of a panel 12a by inserting integral slotted peg 20 through aperture 22 defined in half-pocket 54 and securing the peg therein by driving brace retainer wedge 24 through the integral peg (FIGS. 8 and 11). With brace 14 so secured to panel 12a, each of studs 66 is partially positioned within one of half-pockets 50a. At this point, brace 14 and panel 12a are preferably at a corner of the pool and wall 48 of panel 12a is abutted to wall 94a of corner panel 92, and the two panels are secured together using short pegs 28a and wedges 30.

After the first brace and single panel assembly have been properly oriented, panel 12b, with its brace 14 preferably attached (not shown) is placed into position abutting panel 12a with projections 56 extending into apertures 58 to align the panels (FIG. 9). Brace 14 need not be removed from panel 12a in order to place panel 12b in position. With panels 12a and 12b so aligned, half-pockets 50a and 50b in flanges 46a and 48b mate to define pockets 50, and apertures 52a and 52b in panels 12a and 12b are coaxial with each other and with apertures 70 defined by studs 66 (FIG. 10). Pegs 28 are then inserted through each set of aligned apertures 52 and 70 and secured therein by driving one of wedges 30 through each slotted peg 28 (FIGS. 9 and 10). Succeeding straight panels 12 are similarly attached. When the installer approaches the next succeeding corner, he or she installs a panel 12 without a brace 14 attached. The corner panel 92 may or may not be preattached.

When all of straight panels 12 and corner panels 92 have been erected, the corners of the pool are squared and walls 12 are aligned at their bottoms and leveled in a conventional manner. As is conventional, pieces of steel rod 44b are also driven into ledge 16 through holes 44c in bottom walls 44 of panels 12. Lower rerod 112 (FIG. 1) is inserted through holes 61a in braces 14. Stake 32 of one anchor assembly 31 is driven through each foot 62 into ledge 16 so that approximately six inches of each stake 32 extends above its respective foot. As each panel 12 is plumbed, the hooked end of adjusting rod 102 is inserted into aperture 63b in cross piece 63 and the connected anchor stake 98 is driven into overdig 100. Some installers use such stake and adjusting rod combinations to facilitate wall plumbing. Once stake 98 is anchored in the ground, two nuts, one on each side of stake 98, are threaded on the end of adjusting rod 102, which extends through stake 98. These nuts are adjusted in or out to pull wall 12 towards overdig 100 or allow it to fall away, as required. Where the sub-surface soil is sandy and anchor assemblies 31 will not hold, such a stake 98 and adjusting rod 102 are required.

Once the wall 12 is plumb, wedge 34 is tapped down into forcible engagement with foot 62 (FIG. 16). Anchor 98, adjusting rod 102, and anchor assembly 31 securely maintain each brace 14, and accordingly pool walls 12a and b, in their desired orientation.

After all of braces 14 have been leveled, plumbed, and anchored, a concrete footing, or bonding beam, 104 is poured, encapsulating braces 14 and lower rerod 112 to further secure braces 14 in position. Backfill 106 is then filled in between pool wall assembly 10 and overdig 100.

Vermiculite layer 40 is then compacted onto the pool bottom, extending upwardly (see also FIG. 17) over the lower portion 90 of front surface 26 of pool wall 12 to bead 36.

Coping 108 is then mounted on pool wall assembly 10 using self-drilling/self-tapping screws and concrete apron 110 is poured behind coping 108. Finally, pool liner 98 is suspended from coping 108 to cover panels 12 and 98 and bottom 40. With the additional installation of filling systems, draining systems, and filtration systems, installation of the pool is complete, and, after being filled with water, the pool is ready for enjoyment.

The pool wall assembly of the present invention can be easily, readily, and rapidly assembled by a single installer working alone, primarily due to the fact that each supporting brace may be secured to only one panel in such a way as to not interfere with subsequent securement of an adjacent panel. A second man is only required to sight a transit during leveling and to assist in plumbing and squaring. This enables the single-panel-and-brace assembly to be aligned into a desired orientation prior to the securement of the second abutting panel. Further, because only two pieces need be aligned for interconnection at a time, i.e., (1) brace to first panel and (2) second panel to first panel, the single installer may easily align and interconnect all parts. Finally, the bead defining the lower portion of each panel over which the pool side wall must extend enables the installer to rapidly compact the vermiculite over the lower portion of each panel to the desired level without first having to snap a chalk line.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A pool wall assembly comprising:
a supporting brace;
first and second wall panels *each having a front surface;*
first means for securing said first panel to said brace; and
second means for securing said second panel to at least one of said intersecured brace and first panel, *said front surfaces being aligned with and abutting one another to define a substantially uninterrupted surface,* said second securing means being actuable independently of said first securing means whereby said brace can be secured to only said first panel to facilitate alignment of said brace and first panel prior to securement of said second panel.

2. A pool wall assembly as defined in claim 1 wherein said second securing means comprises means for securing said second panel to both said first panel and said brace.

3. A pool wall assembly comprising:
a supporting brace;
a first wall panel having a front surface;
first means for securing said brace to said first panel only, said first securing means including said first panel defining a first aperture, said first securing means further including said brace including an integral slotted peg extending from said brace through said first aperture, said first securing means further including a first wedge forced into said integral slotted peg to secure said brace to said first panel;
a second wall panel having a front surface;
second means for securing said second panel to at least one of said brace and said first panel with said front surfaces aligned to define a generally continuous surface, whereby said brace may be secured to only said first panel first to facilitate alignment of said brace and first panel together prior to securement of said second panel.

4. A pool wall assembly comprising:
a supporting brace;
a first wall panel having a front surface;
first means for securing said brace to said first panel only, said first securing means including said first panel defining a first aperture, said first securing means further including said brace including an integral slotted peg extending from said brace through said first aperture, said first securing means further including a first wedge forced into said integral slotted peg to secure said brace to said first panel;
a second wall panel having a front surface;
second means for securing said second panel to both said brace and said first panel with said front surfaces aligned to define a generally continuous surface, whereby said brace may be secured to only said first panel first to facilitate alignment of said brace and first panel together prior to securement of said second panel.

5. A pool wall assembly comprising:
a supporting brace;
a first wall panel having a front surface;
first means for securing said brace to said first panel only;
a second wall panel having a front surface;
second means for securing said second panel to at least one of said brace and said first panel with said front surfaces aligned to define a generally continuous surface, whereby said brace may be secured to only said first panel first to facilitate alignment of said brace and first panel together prior to securement of said second panel, said first and second securing means including projection means projecting from said brace and receiving means on said panels for receiving said projection means, said projection means of said first and second securing means including first and second studs, respectively, projecting from said brace, said receiving means including first and second pockets defined by and between said first and second panels and opening rearwardly to receive said first and second studs, respectively.

6. A pool wall assembly comprising:
a supporting brace;
a first wall panel having a front surface;
first means for securing said brace to said first panel only;
a second wall panel having a front surface;
second means for securing said second panel to both said brace and said first panel with said front surfaces aligned to define a generally continuous surface, whereby said brace may be secured to only said first panel first to facilitate alignment of said brace and first panel together prior to securement of said second panel, said first and second securing means including projection means projecting from said brace and receiving means on said panels for receiving said projection means, said projection means of said first and second securing means including first and second studs, respectively, projecting from said brace, said receiving means including first and second pockets defined by and between said first and second panels and opening rearwardly to receive said first and second studs, respectively.

7. A pool wall assembly comprising:
a supporting brace;
a first wall panel having a front surface;
first means for securing said brace to said first panel only;
a second wall panel having a front surface;
second means for securing said second panel to at least one of said brace and said first panel with said front surfaces aligned to define a generally continuous surface, whereby said brace may be secured to only said first panel first to facilitate alignment of said brace and first panel together prior to securement of said second panel, said first and second securing means including projection means projecting from said brace and receiving means on said panels defined by and located between said panels when they abut for receiving said projection means between said first and second panels, whereby said brace can be secured to said first panel only and said second panel can then be placed in position abutting said first panel without removing said brace from said first panel, said projection means of said first and second securing means including first and second studs, respectively, projecting from said brace, said receiving means including first and second pockets defined by and between said first and second panels and opening rearwardly to receive said first and second studs, respectively.

8. A pool wall assembly comprising:
a supporting brace;
a first wall panel having a front surface;
first means for securing said brace to said first panel only;
a second wall panel having a front surface;
second means for securing said second panel to both said brace and said first panel with said front surfaces aligned to define a generally continuous surface, whereby said brace may be secured to only said first panel first to facilitate alignment of said brace and first panel together prior to securement of said second panel, said first and second securing means including projection means projecting from said brace and receiving means on said panels defined by and located between said panels when they abut for receiving said projection means between said first and second panels, whereby said brace can be secured to said first panel only and said second panel can then be placed in position abutting said first panel without removing said brace from said first panel, said projection means of said first and second securing means including first and second studs, respectively, projecting from said brace, said receiving means including first and second pockets defined by and between said first and second panels and opening rearwardly to receive said first and second studs, respectively.

9. A pool wall assembly comprising:
a supporting brace;
a first wall panel having a front surface;
first means for securing said brace to said first panel only;
a second wall panel having a front surface;
second means for securing said second panel to at least one of said brace and said first panel with said front surfaces aligned to define a generally continuous surface, whereby said brace may be secured to only said first panel first to facilitate alignment of said brace and first panel together prior to securement of said second panel, said first and second securing means including first and second studs projecting from said brace and first and second rearwardly opening pockets on said panels receiving said first and second studs, respectively, said first securing means further including an integral peg extending laterally from said first stud, said first pocket including a side wall having an aperture therein to receive said integral peg, said second pocket including opposing side walls having apertures therein, said second studs including second apertures for receiving pegs, said second securing means further including pegs extending through said apertures in said second pocket side walls and in said second studs.

10. A pool wall assembly comprising:
a supporting brace;
a first wall panel having a front surface;
first means for securing said brace to said first panel only;
a second wall panel having a front surface;
second means for securing said second panel to both said brace and said first panel with said front surfaces aligned to define a generally continuous surface, whereby said brace may be secured to only said first panel first to facilitate alignment of said brace and first panel together prior to securement of said second panel, said first and second securing means including first and second studs projecting from said brace and first and second rearwardly opening pockets on said panels receiving said first and second studs, respectively, said first securing means further including an integral peg extending laterally from said first stud, said first pocket including a side wall having an aperture therein to receive said integral peg, said second pocket including opposing side walls having apertures therein, said second studs including second apertures for receiving pegs, said second securing means further including pegs extending through said apertures in said second pocket side walls and in said second studs.

11. A pool wall assembly as defined in claim 3 or 4 wherein said first panel defines a first half-pocket about said first aperture and wherein said brace further comprises a first stud, from which said integral slotted peg extends, located in said first half-pocket.

12. A pool wall assembly as defined in claim 11 wherein said second securing means comprises:
said first panel defining a plurality of second apertures;
said second panel defining a plurality of third apertures;
said brace defining a plurality of fourth apertures;
a plurality of slotted pegs each of which extends through one of said second apertures, one of said third apertures, and one of said fourth apertures; and
a plurality of second wedges each of which is forced into one of said slotted pegs to secure said brace and said first and second panels together.

13. A pool wall assembly as defined in claim 12 wherein said brace further comprises a plurality of second studs each defining one of said fourth apertures and wherein said first and second panels define a plurality of rearwardly opening pockets to receive said second studs.

14. A pool wall assembly as defined in claim 1 or 2 wherein said first and second securing means comprise projection means projecting from said brace and receiving means on said panels for receiving said projection means.

15. A pool wall assembly as defined in claim 5 or 6 wherein said second securing means include pegs, and wherein said first and second panels further include apertures in the opposed side walls of said second pockets for receiving said pegs.

16. A pool wall assembly as defined in claim 15 wherein each of said first and second panels defines one half of each of said second pockets to receive one-half of each of said second studs, whereby each of said second pockets receives one entire second stud, each half of said second pockets including one of said opposed side walls with said apertures therein.

17. A pool wall assembly as defined in claim 1 or 2 wherein said first and second securing means comprise projection means projecting from said brace and receiving means on said panels defined by and located between said panels when they abut, for receiving said projection means between said first and second panels, whereby said brace can be secured to said first panel only and said second panel can then be placed in position abutting said first panel without removing said brace from said first panel.

18. A pool wall assembly as defined in claim 7 or 8 wherein said second securing means include pegs, and wherein said first and second panels further include apertures in the opposed side walls of said second pockets for receiving said pegs.

19. A pool wall assembly as defined in claim 18 wherein each of said first and second panels defines one half of each of said second pockets to receive one half of each of said second studs, whereby each of said second pockets receives one entire second stud, each half of said second pockets includes one of said opposed side walls with said apertures therein.

20. A pool wall assembly as defined in claim 19 wherein said pegs include slots extending laterally therethrough;

wedges for insertion in said slots;

said apertures in said side walls of said second pockets being irregular in shape, said pegs having a similar irregular cross section, said slots being oriented with respect to said cross section such that said slot opens rearwardly in a generally horizontal plane with respect to said panels to facilitate insertion of said wedges into said slots.

21. A pool wall assembly as defined in claim 18 wherein said pegs include slots extending laterally therethrough;

wedges for insertion in said slots;

said apertures in said side walls of said second pockets being irregular in shape, said pegs having a similar irregular cross section, said slots being oriented with respect to said cross section such that said slot opens rearwardly in a generally horizontal plane with respect to said panels to facilitate insertion of said wedges into said slots.

22. A pool wall assembly as defined in claim 7 or 8 wherein each of said first and second panels defines one half of each of said second pockets to receive one half of each of said second studs, whereby each of said second pockets receives one entire second stud, each half of said second pockets includes one of said opposed side walls with said apertures therein.

23. A pool wall assembly as defined in claim 7 or 8 wherein said first securing means further comprises an integral peg extending laterally from said first stud, and wherein said second studs define second apertures for receiving pegs;

said first pocket including a side wall having an aperture therein through which said integral peg extends;

said second pockets including opposed side walls having second apertures therein, said pegs extending through said second apertures in said side walls and in said second studs.

24. A pool wall assembly as defined in claim 23 wherein said first stud has a width approximately one-half the width of said second studs.

25. A pool wall assembly as defined in claim 24 wherein each of said first and second panels defines one-half of each of said second pockets to receive one-half of each of said second studs, whereby each of said second pockets receives one entire second stud, each half of said second pockets includes one of said opposed side walls with said apertures therein.

26. A pool wall assembly as defined in claim 25 wherein said pegs include slots extending laterally therethrough;

wedges for insertion in said slots;

said apertures in said side walls of said second pockets being irregular in shape, said pegs having a similar irregular cross section, said slots being oriented with respect to said cross section such that said slot opens rearwardly in a generally horizontal plane with respect to said panels to facilitate insertion of said wedges into said slots.

27. A pool wall assembly as defined in claim 9 or 10 wherein each of said first and second panels defines one half of each of said second pockets to receive one half of said second studs, whereby each of said second pockets receives one entire second stud.

28. The pool wall assembly of claim 27 in which said first pocket is approximately one half as large as said second pockets and is defined substantially by only one of said first and second panels.

29. A pool wall assembly as defined in claim 9 or 10 wherein each of said first and second panels defines one half of each of said second pockets to receive one half of each of said second studs, whereby each of said second pockets receives one entire second stud, each half of said second pockets includes one of said opposed side walls with said apertures therein.

30. A pool wall assembly comprising:

a supporting brace defining a plurality of first apertures;

a first wall panel having a front surface and a first side defining a plurality of second apertures;

an integral, slotted peg extending from said brace through one of said second apertures;

a first wedge forced into said integral slotted peg to secure said brace to said first panel;

a second wall panel having a front surface and a second side defining a plurality of third apertures, said first, second, and third apertures being generally coaxial to define a plurality of sets of apertures;

a plurality of second slotted pegs each positioned within one of said sets of apertures; and a plurality of second wedges each forced into one of said second slotted pegs to secure said brace and said first and second panels together, whereby said brace may be secured to only said first panel so that said brace and first panel may be aligned together into a desired orientation prior to the securement of said second panel to said first panel.

31. A pool wall assembly as defined in claim 30 wherein said brace further comprises a first stud from which said integral, slotted peg extends and wherein said first side of said first panel defines a first rearwardly opening pocket to receive said first stud.

32. A pool wall assembly as defined in claim 31 wherein said brace further comprises a plurality of second studs each defining one of said first apertures and wherein said first and second panels define a plurality of second rearwardly opening pockets to receive said second studs.

33. A pool wall assembly as defined in claim 30 wherein said brace further comprises a plurality of second studs each defining one of said first apertures and wherein said first and second panels define a plurality of second rearwardly opening pockets to receive said second studs.

34. A pool wall assembly comprising at least one pool wall secured to a supporting brace, said pool wall assembly comprising:

said brace including an aperture therein;

an anchor assembly comprising a stake for driving into the ground, and wedge means;

said stake having a cross section smaller than said aperture in said brace whereby said stake slideably fits within said aperture; and said wedge means slideably mounted in said stake, being wider at the top than bottom, and projecting laterally from said stake, whereby as said wedge is moved down said stake, said wedge eventually engages said brace at the side of said aperture and wedges said stake and wedge combination against the side of said aperture to bind said anchor assembly to said brace.

35. The pool wall assembly of claim 34 wherein said stake is of generally triangular cross section, having two opposite side walls joined by a base wall, with the apex of such triangular cross section missing at least throughout most of the length of said stake whereby said wedge means is carried between said side walls and projects from said missing apex as it is slid down said stake.

36. The pool wall assembly of claim 35 in which said wedge means comprises a wedge generally "V" shaped cross section defined by two joined walls, said walls being wider at the top than bottom, and being spaced from one another at such a distance that said wedge walls frictionally engage said side walls of said stake.

37. The pool wall assembly of claim 36 in which said aperture in said brace is generally triangular in shape and is just slightly larger than the generally triangular shaped cross section of said stake.

38. An improved pool wall panel having a face including an upper portion and a lower portion to be covered by a compacted material, said panel being of the type connected to other similar panels to form a pool wall to support a pool liner, wherein the improvement comprises a generally horizontal, generally linear bead member projecting from said face of said panel mediate said upper and lower portions to delineate said lower portion, said bead member extending substantially the full width of the panel and being alignable with the bead members of adjacent connected panels, whereby the extent to which said lower portion is to be covered by said compacted material may be readily determined without the need for chalk lining said pool wall face.

39. A pool wall panel as defined in claim 38 wherein said bead member is integrally molded of plastic material with said pool wall.

*40. A pool wall assembly as defined in claim 1 wherein said second securing means includes alignment means for vertically aligning said first and second panels.*

*41. A pool wall assembly comprising:*

*a supporting brace;*

*first and second wall panels;*

*first means for securing only said first panel to said brace, whereby said intersecured first panel and brace can be leveled as a unit; and*

*second means for securing said second panel to at least one of said intersecured brace and first panel, said second securing means being actuable independently of said first securing means and including alignment means for vertically aligning said first and second panels, whereby said second panel is aligned with said leveled first panel upon actuation of said second securing means.*

*42. A pool wall assembly as defined in claim 41 wherein each of said panels has a front surface aligned with and abutting one another when interconnected to define a substantially uninterrupted surface.*

* * * * *